(12) United States Patent
Park

(10) Patent No.: US 7,044,801 B2
(45) Date of Patent: May 16, 2006

(54) DIGITAL VIDEO RECORDER WITH SLOT TYPE MAINBOARD

(75) Inventor: Jung-Jae Park, Sungnam-si (KR)

(73) Assignee: Rifatron Co., Ltd., Seoul (KR)

( * ) Notice: Subject to any disclaimer, the term of this patent is extended or adjusted under 35 U.S.C. 154(b) by 0 days.

(21) Appl. No.: 10/910,358

(22) Filed: Aug. 4, 2004

(65) Prior Publication Data

US 2005/0032432 A1    Feb. 10, 2005

(30) Foreign Application Priority Data

Aug. 6, 2003    (KR) ...................... 10-2003-0054382

(51) Int. Cl.
*H01R 25/00*   (2006.01)
*H01R 27/02*   (2006.01)
*H01R 31/00*   (2006.01)

(52) U.S. Cl. ......................................... 439/638; 439/65

(58) Field of Classification Search ................ 439/638, 439/65, 61, 45, 75
See application file for complete search history.

(56) References Cited

U.S. PATENT DOCUMENTS

| 5,754,796 | A  | * | 5/1998  | Wang et al. ................. 710/301 |
| 6,039,581 | A  | * | 3/2000  | DiMarco ...................... 439/74 |
| 6,409,526 | B1 | * | 6/2002  | Malone et al. .............. 439/160 |
| 6,482,042 | B1 | * | 11/2002 | Tupper ........................ 439/638 |
| 6,533,587 | B1 | * | 3/2003  | Potter et al. .................. 439/65 |
| 6,899,547 | B1 | * | 5/2005  | Chang et al. ................. 439/65 |

* cited by examiner

*Primary Examiner*—Hae Moon Hyeon
(74) *Attorney, Agent, or Firm*—Finnegan, Henderson, Farabow, Garrett & Dunner, L.L.P.

(57) ABSTRACT

The present invention is related to a digital video recorder comprising a plurality of male slots, an image compression substrate including a plurality of channels, and a male-female connector connected to a lower surface of the image compression substrate and inserted into one of the plurality of male slots. A male connector may be arranged on a side surface of the male-female connector and may connect to a substrate female connector formed on the lower surface of the image compression substrate. A female connector may be arranged on another side surface of the male-female connector and may be inserted into the one of the plurality of male slots.

6 Claims, 2 Drawing Sheets

DIGITAL VIDEO RECORDER WITH SLOT TYPE MAINBOARD

TECHNICAL FIELD

The present invention is related to a digital video recorder, in particular to a digital video recorder with slot type mainboard.

1. Background Art

A conventional digital video recorder has generally been produced in the form of not a slot type but an on board type substrate and has been assembled. Therefore, it was not possible to rapidly cope with a change in the number of channels. That is, there was a problem that according to the number of channels required by users, a new substrate for the conventional digital video recorder had to be manufactured. Conventional digital video recorder was generally produced with setting four channels as a basis. But, nowadays, as the functions of the digital video recorder are getting diversified, versions of digital video recorders are increasing bit by bit while connecting the digital video recorder to various kinds of outside devices. So, since the number of necessary channels is increasing, there has been difficulty in changing the number of channels.

2. Disclosure of the Invention

Accordingly, the present invention solves above-mentioned conventional technical problems, and the object of the present invention is to provide a digital video recorder that can increase the number of channels available for connecting the digital video recorder to outside devices.

The structure of the present invention for achieving above purpose is composed of a plurality of male slots, image compression substrate including a plurality of channels, female connector which is connected to one side of lower surface of image compression substrate, and inserted into one of a plurality of male slots, male connector arranged on the side surface of the female connector, and female connector which is connected to the male connector and is formed on one side of lower surface of image compression substrate.

EMBODIMENT OF THE INVENTION

The preferred embodiment will be described in detail with referring to the attached drawings.

Figure 1:
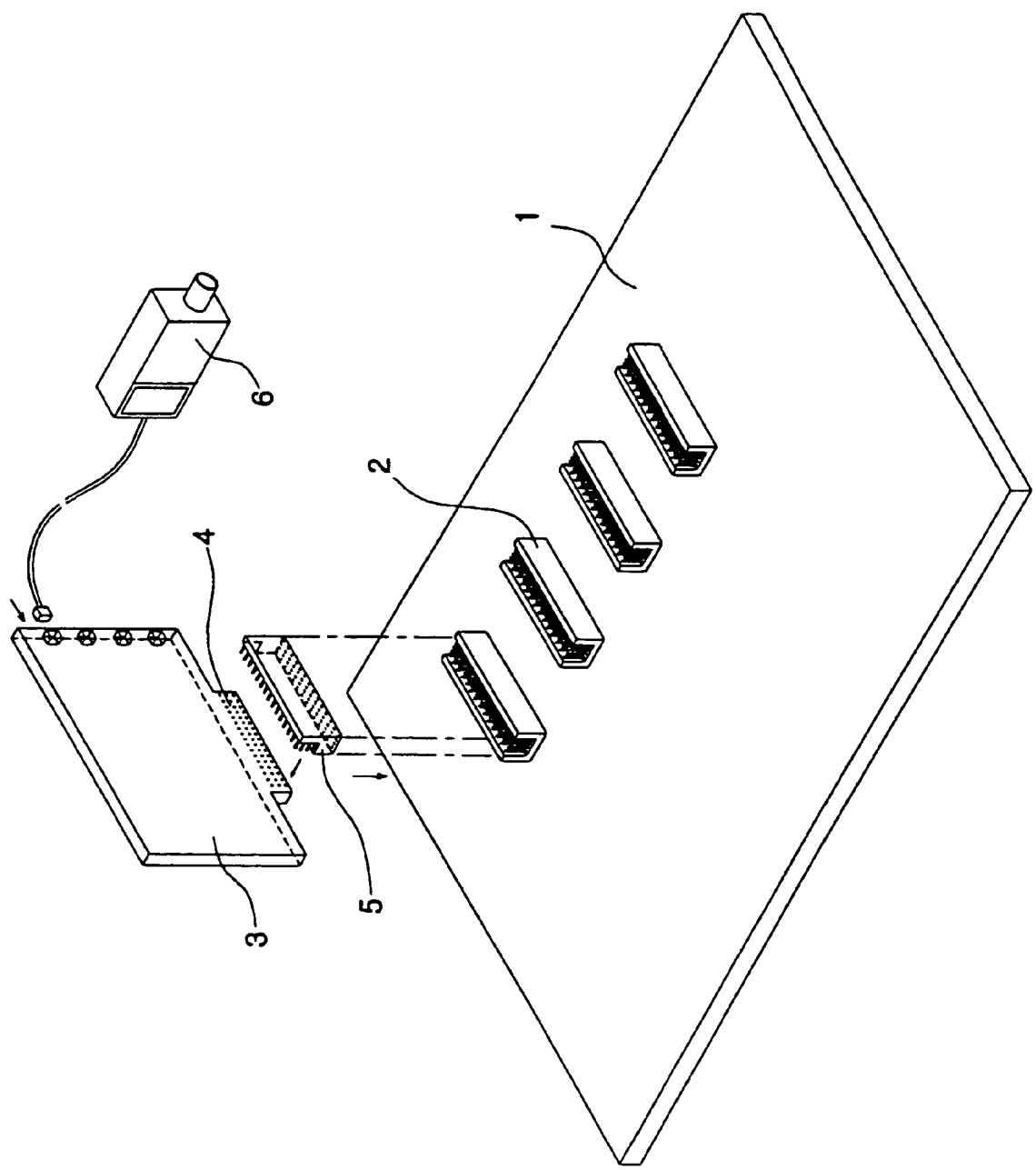
FIG. 1 shows a slanting view representing the connection relationships between slot mounted on mainboard of digital video recorder, and image compression substrate.

FIG. 1 shows a slanting view representing the connection relationships between slot mounted on mainboard of digital video recorder (not shown), and image compression substrate.

Figure 2:
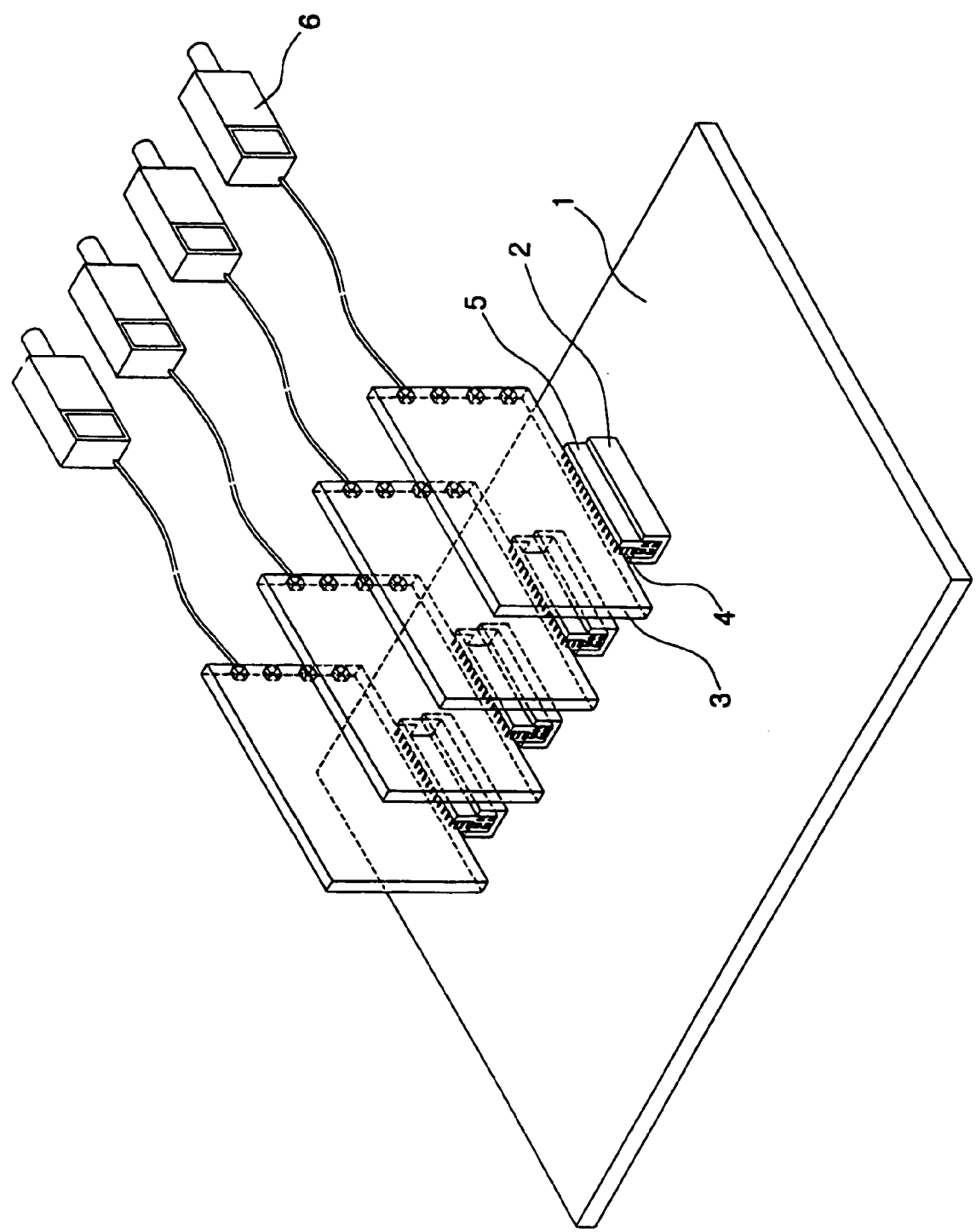
FIG. 2 shows a slanting view representing the connection relationships between digital video recorder, and image compression substrate mounted on mainboard.

As is shown, the image compression substrate is connected to one male slot (2) of a plurality of male slots (2) mounted on the mainboard. The connection relationships will be described in detail. A male-female connector (5) is inserted between the male slot (2), and a female connector (4) protruding from the lower part of one side of the image compression substrate (3), thereby connecting the slot (2) and the female connector (4). That is, the male slot (2) is connected to the female connector of the male-female connector (5), and the female connector (4) of the image compression substrate (3) is connected to the male connector of male-female connector (5). Therefore, based upon the above-mentioned relationships, the image compression substrate (3) is connected to one of a plurality of male slots (2) mounted on the mainboard (1). The image compression substrate (3) will be explained in detail with reference to FIG. 1 and FIG. 2. Four connection terminals (not shown) are arranged on one side of the image compression substrate (3). Accordingly, it can be connected to the outside devices (6) such as video camera and CCTV. Then, the image formed by combining the image input, which is inputted through an image input terminal of the image compression substrate (3) from the outside devices (6) connected as described above, is transmitted to the input of a digital signal processor (not shown) and is compressed. Each image of the compressed outside image input is transmitted to the mainboard (1) through male slot (2) as the stream, respectively. Accordingly, depending upon how many image compression substrates (3) are inserted into the mainboard (1), it is possible to produce a digital video recorder having four channels, 8 channels or 12 channels.

The embodiment of the present invention is described only for the illustration, it is natural that the changes or the modifications can be made by a person having ordinary skill in the art to which the invention pertains if they are within the scope and true meanings of the present invention.

POSSIBILITY OF THE INDUSTRIAL APPLICATION

In connection with the structure of the mainboard of the digital video recorder of the present invention, each male slot (2) can receive one substrate (3), and digital video recorder products may easily be assembled by inserting substrates (3) into male slots (2). Besides, when the products are damaged or do not function, the products may be repaired by replacing only a damaged substrate with a new one, and there is an effect that it is possible to use the products by replacing only the substrate with a new one when the products are upgraded or the functions are changed, and it is necessary to replace the substrate.

The invention claimed is:

1. A digital video recorder comprising:
   a digital video recorder mainboard surface having a plurality of male slots;
   an image compression substrate for accommodating a plurality of image channels and having a planar surface for holding components;
   a male-female connector having a side surface;
   a female connector arranged on the side surface of the male-female connector and inserted into one of the plurality of male slots; and
   a substrate female connector connected to the male-female connector and formed on an edge of the planar surface of the image compression substrate,
   wherein the male-female connector and the substrate female connector arrange the planar surface of the image compression substrate at an angle substantially perpendicular to the digital video recorder mainboard surface.

2. A digital video recorder comprising:
   a plurality of male slots included on a digital video recorder mainboard surface;
   an image compression substrate including a plurality of channels;

a male-female connector having a side surface;
a female connector arranged on the side surface of the male-female connector and inserted into one of the plurality of male slots; and
a substrate female connector formed on an edge of the image compression substrate and connected to the male-female connector.

3. The digital video recorder of claim 2, wherein the substrate female connector is formed on a protrusion of the image compression substrate.

4. The digital video recorder of claim 3, wherein the substrate female connector is arranged on a surface of the protrusion that is substantially perpendicular to the digital video recorder mainboard surface.

5. The digital video recorder of claim 2, wherein the image compression substrate includes at least four channels.

6. A digital video recorder comprising:
a digital video recorder mainboard surface including a plurality of slots;
an image compression substrate including a plurality of channels and having a planar surface for holding components;
a protruding connector formed on the image compression substrate; and
a male-female connector for connecting the protruding connector with one of the plurality of slots,
wherein the male-female connector arranges the planar surface of the image compression substrate at an angle substantially perpendicular to the digital video recorder mainboard surface.

* * * * *